Figure 1:
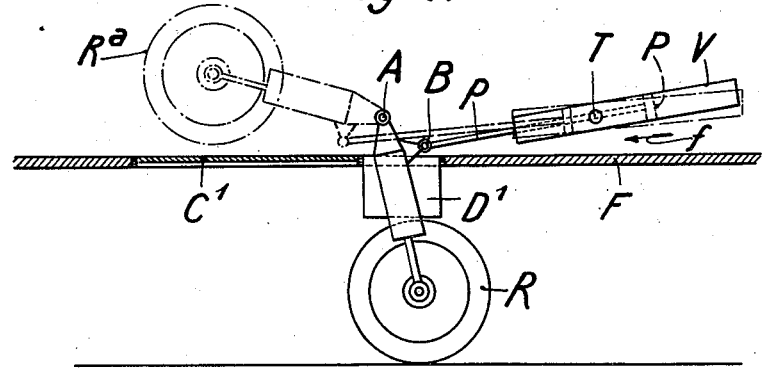

May 14, 1935.   R. L. LÉVY   2,001,620
RETRACTABLE LANDING GEAR FOR AEROPLANES
Filed Aug. 8, 1934   3 Sheets-Sheet 1

Inventor
R. L. Lévy,
By Glascock Downing & Seebold
Attys.

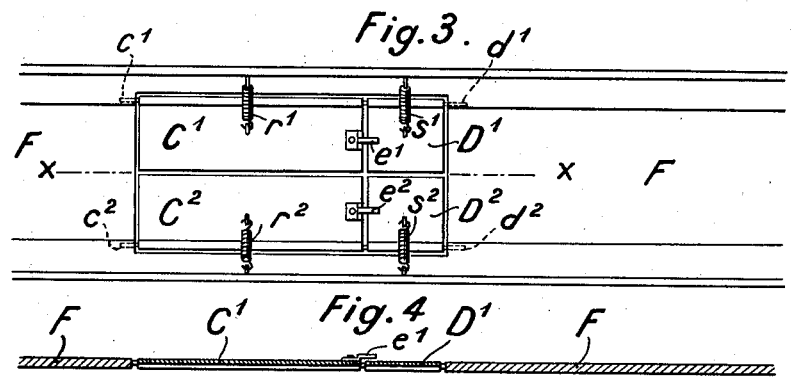
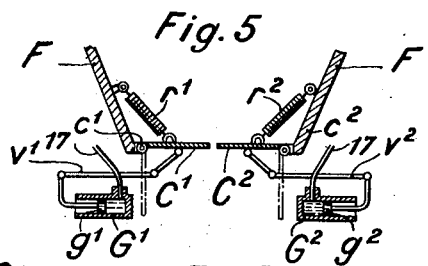
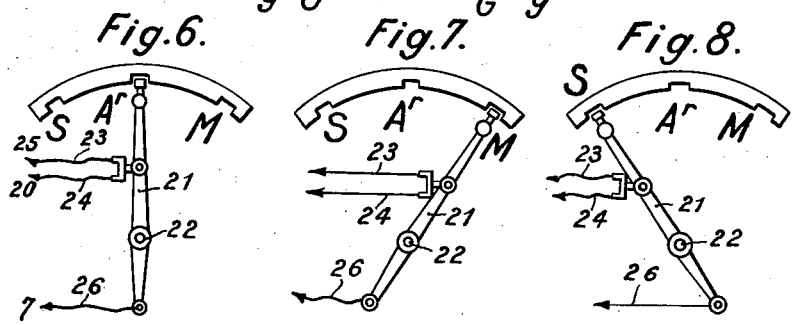
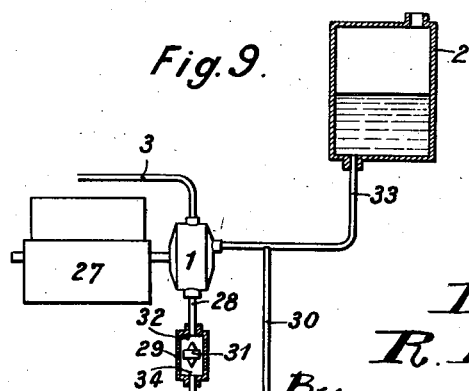

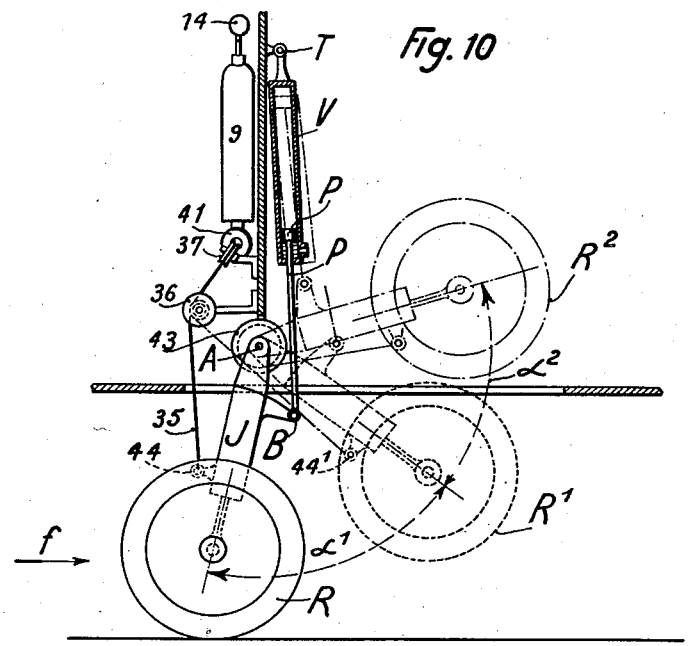
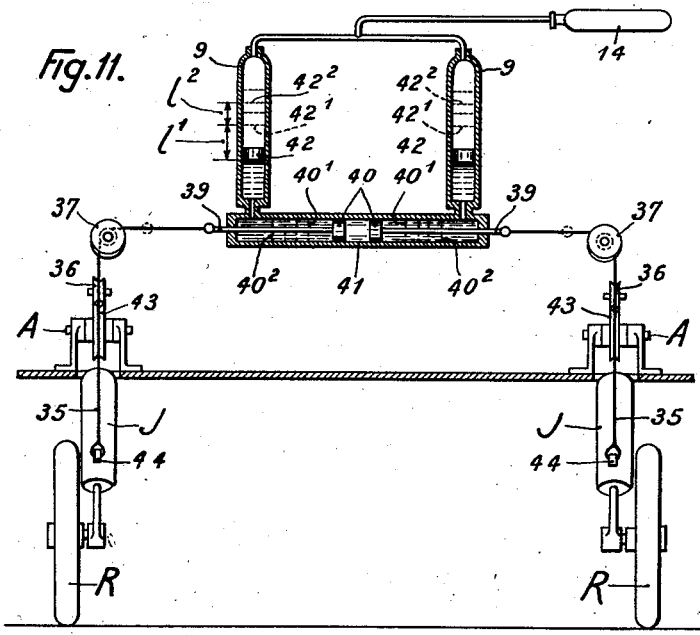

Patented May 14, 1935

2,001,620

UNITED STATES PATENT OFFICE 2,001,620

RETRACTABLE LANDING GEAR FOR AEROPLANES

René Lucien Lévy, Montrouge, France, assignor to Societe d'Inventions Aeronautiques et Mechaniques S. I. A. M., Fribourg, Switzerland Application August 8, 1934, Serial No. 739,043
In France March 27, 1934

7 Claims. (Cl. 244—2)

In aeroplanes comprising landing gear adapted to be retracted during flight—that is to say, drawn up into the interior of the body (fuselage or wing) of the aeroplane—safety requires that the landing gear should be adapted to be restored, without fail, at any moment and at the will of the pilot, into its lowered position for running on the ground.

In certain known systems, the lowering of the landing gear, after said gear has been released, is effected by its own weight.

In other systems, the operation of lowering, like that of raising, is effected in a positive manner by means of a jack, or similar device, functioning by alternative injections of a liquid. In these systems a balancing device is often provided which ensures permanently easement of the weight of the gear, in order to facilitate its actuation in both directions.

The first stage in actuating the gear consists in bringing into operation a pump, which may be worked, manually, by the pilot or driven by the aeroplane engine. In the former case, the operations impose a serious strain on the pilot in certain circumstances. In the second case their reliable performance may be affected by engine failure.

In contrast to these known systems, in which the raising and lowering are entirely independent operations, the invention consists, substantially in establishing, between two consecutive operations, of raising and then lowering the gear, such a connection that—for lowering—the action of gravitation is supplemented by another motive action, the energy for which has been stored up during the previous raising operation.

In other words, in systems according to the invention, every raising operation includes, at the same time, the preparation, and the establishment of adequate conditions, for ensuring the reliable performance of the succeeding lowering operation at the moment selected by the pilot.

The motive energy for causing the lowering may be stored up in various forms without affecting the principle that is characteristic of the invention, namely, establishing a condition of interdependence between a lowering operation and the preceding raising operation.

In the case in which the raising is effected by hydraulic means, it will be of advantage to have recourse to a hydro-pneumatic accumulator, such as that of which an example is given hereinafter. In this same case, a raising system designed in accordance with the invention will comprise, for example, a jack connected, on the one hand, with a driving pump and with exhaust means, and on the other hand with the said accumulator through a hydraulic blocking device.

This blocking device, which forms an important part of the invention, allows free circulation of the liquid, operating the jack, towards the accumulator, and reciprocally, during the course of raising and lowering respectively. On the other hand, it prevents the jack from all movement in the direction corresponding with the raising operation and, so long as the pump pressure does not intervene to release it, ensures the locking of the gear in position for landing.

The invention also relates to the combination of this system of trapdoors provided in the body of the aeroplane and, normally, closing the openings provided for the passage of the gear, but giving way before the latter during the operations of raising and lowering, the actuation of said trap-door being allotted, for example, to the pump that works the jacking device.

Another object of the invention consists of a simple system enabling the valves intended to act during the actuation of the gear and the trapdoors, to be controlled by working a single lever from the pilot's position in the aeroplane.

The invention also comprises a device for recuperating the leakages that may effect the motive pump.

Finally, the invention comprises an embodiment in which the lowering operation is performed in two stages—the second of which follows the first without any interruption—and under such conditions that the major portion of the motive energy available in the accumulator is expended in the final lowering stage, that is to say, when the moment of gravitational force of the swinging system is weakest, whilst at the same time, the resistance offered to the lowering movement by the air is greater.

A typical embodiment of the invention is illustrated in the accompanying drawings.

Figure 2:
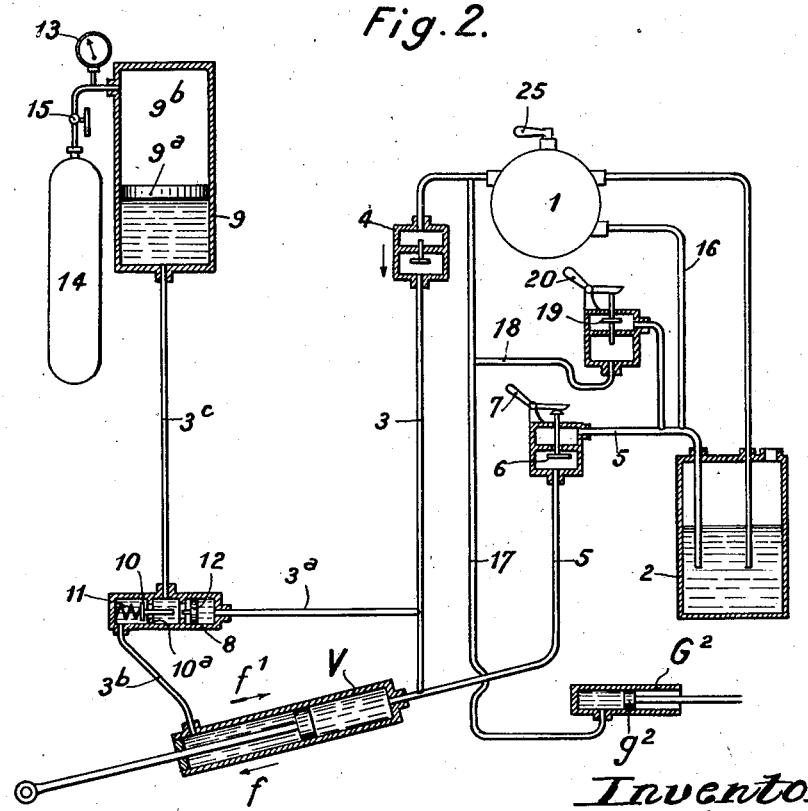

Figure 1 represents, by way of remainder, the diagram of a lowering and raising operation of a landing gear. Figure 2 is a general diagram of the installation of this invention showing the system of controlling the combined actuation of the gear and the trapdoors.

Figure 3 is a plan of the trapdoors. Figures 4 and 5 are longitudinal and transverse views corresponding with Figure 3. Figures 6, 7 and 8 are detail views showing the control lever in its three positions. Figure 9 is a diagram of the device for recuperating the leakages from the pump. Figure 10 is a side elevation of the control for raising a single wheel, in a variant. Figure 11 is a diagrammatic front elevation of the same device for a gear with two wheels.

As a concrete example, Figure 1 represents, diagrammatically, the connection of a wheel R of a landing gear with its lifting jack V, which latter is adapted to swing on trunnions T. The rod $p$ of its piston P is articulated at B to the arm carrying the wheel R. The raising to the position $R^a$, inside the fuselage F, or the lowering, are effected by rotation about an axis A.

The hydraulic control (Figure 2) of the lifting jack, or jacks V is effected by means of a hydraulic pump 1 driven, for example, by the engine of the aeroplane. The pump 1, which is fed from a tank 2, is connected with the jack V by way of a pipe 3, provided with an automatic valve 4, which allows the liquid to pass only in the direction of the arrow (alongside said valve).

For exhausting, the jack V is connected with the tank 2 by a pipe 5 fitted with a valve 6 which, in contrast to the valve 4, is controlled by the pilot, directly or not, by means of any suitable device, such as a lever 7.

One of the characteristic elements of the invention is constituted by a hydraulic blocking device 8 interposed in a pipe $3^b$, $3^c$ connecting the hydraulic accumulator 9 with the chamber in the jack V remote from the admission chamber of said jack.

The hydraulic blocking device 8 comprises, on the one hand, a valve 10 which a spring 11 tends to hold in contact with its seating $10^a$, and on the other hand a piston 12 the rod of which is adapted to push back the stem of the valve 10. The hydraulic accumulator 9 is formed by a vessel containing oil and connected with the control circuit, said oil being topped by a piston $9^a$ above which is a cushion $9^b$ of compressed gas.

For security, a cylinder 14 containing a gas under high presure, such as air (compressed at 100 kg.) and put into service by means of a cock 15, enables the lowering of the gear to be ensured when the gauge 13 shows the pressure in the accumulator to be too low.

Finally, a by-pass 16 connects the pump 1 with the tank 2 when the pressure in the delivery pipe 3 exceeds a predetermined value.

According to the invention, the above described raising mechanism may, optionally, be combined with the control of trapdoors intended to close, more or less completely the openings through which the landing gear passes into and out of the fuselage.

In the example shown in Figures 3 to 5, these openings are closable by means of two pairs of trapdoors $C^1$—$C^2$ and $D^1$—$D^2$, adapted to tip on axes $c^1$—$c^2$ and $d^1$—$d^2$, parallel with the axis $x$—$x$ of the retraction opening. These trapdoors are continuously subjected to the action of springs $r^1$—$r^2$ and $s^1$—$s^2$, which tend to hold them in, or return into, the closed position (ends in contact). The trapdoors $C^1$ and $C^2$ are provided with fingers $e^1$ and $e^2$, respectively, projecting above the adjacent trapdoor $D^1$ and $D^2$, in such a manner that the opening of the former causes the opening of the latter.

As will be evident later, all that is necessary for performing all the operations for opening and closing the trapdoors is to provide positive means for opening the doors $C^1$—$C^2$, for example, by equipping them with control cylinders $G^1$ $G^2$ the pistons $g^1$ $g^2$ of which exert a lowering action on said trapdoors through any suitable link mechanism $v^1$ $v^2$. The cylinders $G^1$ $G^2$ are connected with the motive pump 1 by a pipe 17 (Figure 2) from which branches a pipe 18 that passes through a valve 19 before returning to the tank 2. This valve 19 is normally in the open position, that is to say, corresponding with exhausting. Consequently, the object of the control of said valve—for example, by means of a lever 20—is to close it at the moments when the pump 1 is to actuate the pistons $g^1$ $g^2$ of the cylinders $G^1$ $G^2$ in order to open the trapdoors $C^1$—$C^2$ prior to raising the gear.

Figures 6 to 8 show, diagrammatically, the action of a control lever 21 located at the pilot's post and enabling the pilot to actuate, at the moments and in the order desired, the starting of the pump and the controlled valves, 6 and 19 respectively, the functioning of the valve 4 being always automatic.

The lever 21 is adapted to turn on an axis 22 and to be set in any of the three positions: $A^r$ corresponding with neutral, M with raising and S with lowering. On one side of the pivotal axis 22, two cables, rods or the like, 23, 24, are attached to the lever 21 and, on the other hand, are connected respectively with the starting lever 25 of the pump 1 and the control lever 20 of the valve 19. On the other side of the pivotal axis 22, a cable, rod or the like 26, is attached to the lever 21 and is connected, on the other hand, with the control lever 7 of the valve 6.

This hydraulic system for controlling the raising of the gear functions in the following manner:

To raise the gear, the pilot sets the lever 21 in the position M (Figure 7). The cable 23 pulls the lever 25 and starts the pump 1, whilst the cable 24 pulls the lever 20 (Figure 2) and closes the exhaust of the control cylinders $G^1$ $G^2$ of the trapdoors.

When the pump 1 comes into action, it has to overcome the effort due to the passage of the valve 4 and to the displacement of the lifting piston contained in the jack V. In order to do this, the pressure must first have driven the pistons $g^1$ $g^2$ to the end of their strokes, on account of the small section of said pistons and the minimum effort they have to exert in order to lower the trapdoors $C^1$—$C^2$. It is therefore certain that the gear will not begin to ascend until after said trapdoors $C^1$—$C^2$ have been opened.

The trapdoors $D^1$ and $D^2$, which are as one with the trapdoors $C^1$—$C^2$, respectively, for opening, close automatically under the action of the springs $S^1$, $S^2$ when no longer held open by the gear.

By acting on the piston 12 in the valve chest 8, the lifting pressure prevailing in the pipes 3 and $3^a$ opens the valve 10, which enables the back pressure due to the retraction of the gear to exert itself in the tank 9 through the pipes $3^b$ and $3^c$.

When the gear has been fully raised, the pump 1 delivers through the by-pass 16.

The pilot being notified by an indicator (not shown) that the gear has reached the top position, sets the control lever 21 in the position $A^r$ (Figure 6), thereby simultaneously stopping the pump 1 and opening the valve 19.

The effect of this latter operation is to relieve the pressure existing in the lifting cylinders $G^1$, $G^2$ of the trapdoors $C^1$, $C^2$, and thus allow these latter to close under the pull of the springs $r^1$ and $r^2$.

In the top position, the gear is blocked by the presence of the valve 4 and the closing of the valve 6.

To lower the gear, all that is necessary, therefore, is to open the valve 6 to allow the lifting liquid to return to the tank by way of the pipe 5, the gear being lowered by the action of the pressure accumulated in the cushion $9^b$. This lowering operation corresponds with the position $S^1$ (Figure 8) of the lever 21. It should be noted that the valve chest 8 offers no opposition to the passage of the liquid from the vessel 9 to the lifting jack V.

During the descent of the gear, the trapdoors are opened by the direct action of the gear thereon. When the gear reaches its low position, the trapdoors $C^1$ and $C^2$ close automatically under the action of the springs $r^1$ and $r^2$. On the other hand, the trapdoors $D^1$ and $D^2$ are obliged to remain open, being held in that position by the gear (see Figure 1).

When the gear is completely lowered, the valve 10 in the valve chest 8 closes under the action of the spring 11, and assures the automatic blocking of the gear.

It should be mentioned that, irrespective of the position of the gear when stopped during its descent, it will always be blocked automatically by the action of the valve chest 8.

The device for recuperating leakages—which device is applied only in the case in which the reservoir 2 is on a higher level than that of the pump 1—is represented in Figure 9.

The pump 1, driven by a motor 27, draws from the tank 2, by way of a pipe 33 and delivers to the jack V by way of the pipe 3.

The leakages from the pump 1 are directed, through a pipe 28, towards a recuperator 29 which, on the other hand, is connected by a pipe 30 with the suction pipe 33. The recuperator 29 consists substantially of an enclosed space housing a movable float 31 with upper and lower needle valves.

When the pump 1 is not working, the tank 2 fills the recuperator 29 with liquid by gravitation, so that the upper needle valve of the float 31 closes the mouth 32 of the pipe 28. There is then no liquid above said mouth.

When the pump 1 is started, the suction produced in the pipe 33 induces a negative pressure in the pipe 30, and consequently the liquid contained in the recuperator 29 is thereby drawn into the suction pipe 33 of the pump and the lower needle valve of the float 31 closes the mouth 34. At this moment, the leakages that may occur while the pump 1 is working, fill the upper part of the recuperator 29 through the orifice 32, and the liquid collected in this manner rises gradually in the space 29, the float 31 being held down by the suction in the pipe 30.

When the pump 1 stops, suction ceasing in the pipe 30, the float 31 rises and its upper needle valve again closes the orifice 32. The collected liquid mingles with that descending, by gravitation, from the tank 2, and will therefore be aspirated next time the pump 1 is set to work.

The cubic capacity of the enclosed space 29 is preferably calculated so that the leakages recuperated during the working of the pump 1 in the course of a raising operation are insufficient to fill it.

Moreover, if said space 29 were to become full, the hydrostatic pressure acting on the float 31 would raise the latter and the surplus liquid would be aspirated through the pipe 30.

This device for recuperating the leakages may, of course, be applied in a great variety of instances other than the control system for landing gears, which forms the principal object.

In the device represented in Figures 10 and 11, each wheel R of the landing gear is under the action of a lifting jack V of the single-acting type, that is to say, serves as a motor solely for the raising operation. Each jack is adapted to swing on trunnions T, and the rod $p$ of its piston P is connected with the arm carrying the wheel R—for example, the leg J—by a pivot B. In raising or lowering, the carrier member J pivots on an axis A.

In this case, the hydro-pneumatic accumulator 9 is connected with the corresponding wheel, or with the member carrying said wheel, by means of a cable 35 which, passing over the pulleys 36, 37 is attached to the rod 39 of a piston 40 moving in a cylinder 41, communicating with the hydro-pneumatic accumulator 9, the conditions being such that, for each position of the piston 40, there is a corresponding definite position of the piston 42 of the accumulator, and vice versa.

Finally, a pulley 43 of suitable diameter is mounted on the lifting axis A of the wheel R.

This device functions in the following manner:

For the raising operation, the wheel R is lifted by the action of the jack V, from its running position R and, at first, after passing through an angle $\alpha'$ reaches an intermediate postion $R^1$ at which the cable 35 becomes tangential to the pulley 43.

During this first stage of the swinging movement, the cable 35 has been drawn out to a comparatively large extent, corresponding with the difference in the distances separating the pulley 36 from each of the successive positions 44 and $44^1$ of the point of attachment of said cable.

The auxiliary piston 40 has been drawn outward for an equal distance, as far as the position indicated at $40^1$, and the main piston 42 of the accumulator 9 has arrived at the position indicated at $42^1$, equivalent to an ascent of $l^1$.

It should be noted that, during this first stage of raising, on the one hand, the air resistance to the advance of the aeroplane, acting in the direction of the arrow $f$, Figure 10, largely facilitates the raising operation, and that, on the other hand, the moment of the gravitational force of the wheel on its lifting axis is relatively small, so that, by reason of these two factors, the resistance offered by the wheel to the action of the jack V is trifling, the greater portion of the work performed by the jack then serving to increase the pressure in the accumulator 9 by an amount which is a function of the change of level $l^1$ of the piston 42.

In the second stage, in which the wheel is brought from the intermediate position $R^1$ to the top position $R^2$, in passing through the angle $\alpha^2$ the action of these two beneficial factors decreases. The working effort of the jack V is then employed, almost entirely, in overcoming the effort of resistance of the wheel, so that a small portion of the operative energy remains available for increasing the pressure in the accumulator 9 by an amount corresponding with the distance $l^2$ and the pistons 40 and 42 coming respectively into the positions $40^2$ and $42^2$.

During this second stage, however, the extent to which the cable 35 is drawn out is very small, since it corresponds with the small arc over which the cable bears against the pulley 43 during the passage of the wheel from the position $R^1$ to the position $R^2$.

Consequently, during the ascent from the position R to the position $R^2$, a correlation exists, on the one hand, between the variations in pressure set up, in the accumulator 9, by the pull of the cable 35, and, on the other hand, the amount of energy remaining available from the jack V, for increasing the accumulator pressure, whilst ensuring the raising operation.

A similar correlation—the practical results of which, however, are more important—exists, during the lowering operation, between the operative energy furnished by the accumulator 9—according to the principle of the invention—and the energy required for ensuring the descent. It will be seen easily, in fact, that at the beginning of the descent—from the position R² to the position R¹—the retrograde movement of the cable 35 is merely small. This is the stage during which the operative action of the accumulator 9 is slight, since the moment of gravitational force of the swinging system is high and the air resistance low. In the second stage—from the position R¹ to the position R—the work the accumulator 9 is required to perform is far greater but the cable 35, and therefore, the piston 42 are caused, precisely at this moment and by reason of the mechanical connections, to describe a long retrograde movement. In other words, the large amount of energy absorbed by the gear, during the second stage of the descent is available to the accumulator 9 at precisely that moment.

In the lowered position, the gear is locked by means of pawls (not shown) actuated by the pilot.

It is to be understood that the above described device may be combined with certain of those illustrated in the preceding figures, especially with the trapdoor control system.

It will be evident that, without departing from the scope of the invention, the cable 35 could act directly on the movable member of the accumulator 9, instead of on the intermediate piston 40.

This variant of the device therefore possesses the remarkable characteristic that the maximum amount of motive power required for lowering the wheel of the gear is available precisely at the opportune moment, that is to say at the end of the descent. In these conditions, the landing gear is returned, without fail, at a high velocity, to the bottom of its downward travel.

What I claim as my invention and desire to secure by Letters Patent is:—

1. A system of landing gear for aeroplanes, comprising a generator of fluid under pressure, a hydraulic jack connected to the said generator and to an exhaust conduit, a connection between the landing gear and the movable element of this hydraulic jack, a pressure fluid accumulator connected to this hydraulic jack, a hydraulic blocking device interposed between said jack and said accumulator and connected to the pressure fluid generator.

2. A system of landing gear for aeroplanes, comprising a pressure fluid generator, a hydraulic jack connected to said generator and to an exhaust conduit, a connection between the landing gear and the movable element of this hydraulic jack, a pressure fluid accumulator connected to this hydraulic jack, a hydraulic blocking device interposed between said jack and said accumulator and connected to the pressure fluid generator, an automatic valve in the conduit connecting the pressure fluid generator and the hydraulic jack, so as to allow the pressure fluid to pass only from the generator to the hydraulic jack, but not in the reverse direction, a valve controlled by the pilot and interposed in the exhaust conduit extending from the hydraulic jack.

3. A system of retractable landing gear for aeroplanes, comprising a pressure fluid generator, a jack or the like connected to this generator, a connection between the movable element of this jack and the landing gear, a pressure fluid accumulator, a movable member in this accumulator, a cable connecting this movable member to an element rigid with the landing gear in the raising and lowering operations, means such that, for a definite angle described by the landing gear, the stroke of the cable is greater during the second stage of the descent of the landing gear, than in the first stage, and reversely for raising the landing gear.

4. A system of retractable landing gear for aeroplanes, comprising a pressure fluid generator, a jack or the like connected to this generator, a connection between the movable element of this jack and the landing gear, a pressure fluid accumulator, a movable member in this accumulator, a cable connecting this movable member to an element rigid with the landing gear in the raising and lowering operations, a pulley on which the said cable passes and the axis of which coincides with the lifting axis of the landing gear.

5. A system of landing gear for aeroplanes, comprising a pressure fluid generator, a hydraulic jack connected to the said generator and to an exhaust conduit, a connection between the landing gear and the movable element of this hydraulic jack, a pressure fluid accumulator connected to said hydraulic jack, a hydraulic blocking device interposed between said jack and said accumulator and connected to the pressure fluid generator, a system of trapdoors provided in the body of the aeroplane for the passage of the landing gear, means for causing the opening of these trapdoors to be under the control of the pressure fluid generator.

6. A system of landing gear for aeroplanes, comprising a pressure fluid generator, a hydraulic jack connected to the said generator and to an exhaust conduit, a connection between the landing gear and the movable element of this hydraulic jack, a pressure fluid accumulator connected to said hydraulic jack, a hydraulic blocking device interposed between said jack and said accumulator and connected to the pressure fluid generator, a system of trapdoors provided in the body of the aeroplane for the passage of the landing gear, means for causing the opening of these trapdoors to be under the control of the pressure fluid generator, a hydraulic cylinder for each of the trapdoors, a connection between this cylinder and the pressure fluid generator, an exhaust conduit extending from the said connection, a valve controlled by the pilot and interposed in the said exhaust conduit.

7. A system of landing gear for aeroplanes, comprising a pressure fluid generator, a hydraulic jack connected to the said generator and to an exhaust conduit, a connection between the landing gear and the movable element of this hydraulic jack, a pressure fluid accumulator connected to said hydraulic jack, a hydraulic blocking device interposed between said jack and said accumulator and connected to the pressure fluid generator, a system of trapdoors provided in the body of the aeroplane for the passage of the landing gear, means for causing the opening of these trapdoors to be under the control of the pressure fluid generator, a hydraulic cylinder for each of the trapdoors, a connection between this cylinder and the pressure fluid generator, an exhaust conduit extending from the said connection, a valve controlled by the pilot and interposed in the said exhaust conduit, a single lever controlled by the pilot and ensuring the operation of all the valves controlling the movements of the landing gear and of the trapdoors, except however, the automatic valve arranged between the pressure fluid generator and the hydraulic jack.

RENÉ LUCIEN LÉVY.